(No Model.)
W. L. DISMUKES.
ROLLER BEARING.
No. 582,521. Patented May 11, 1897.
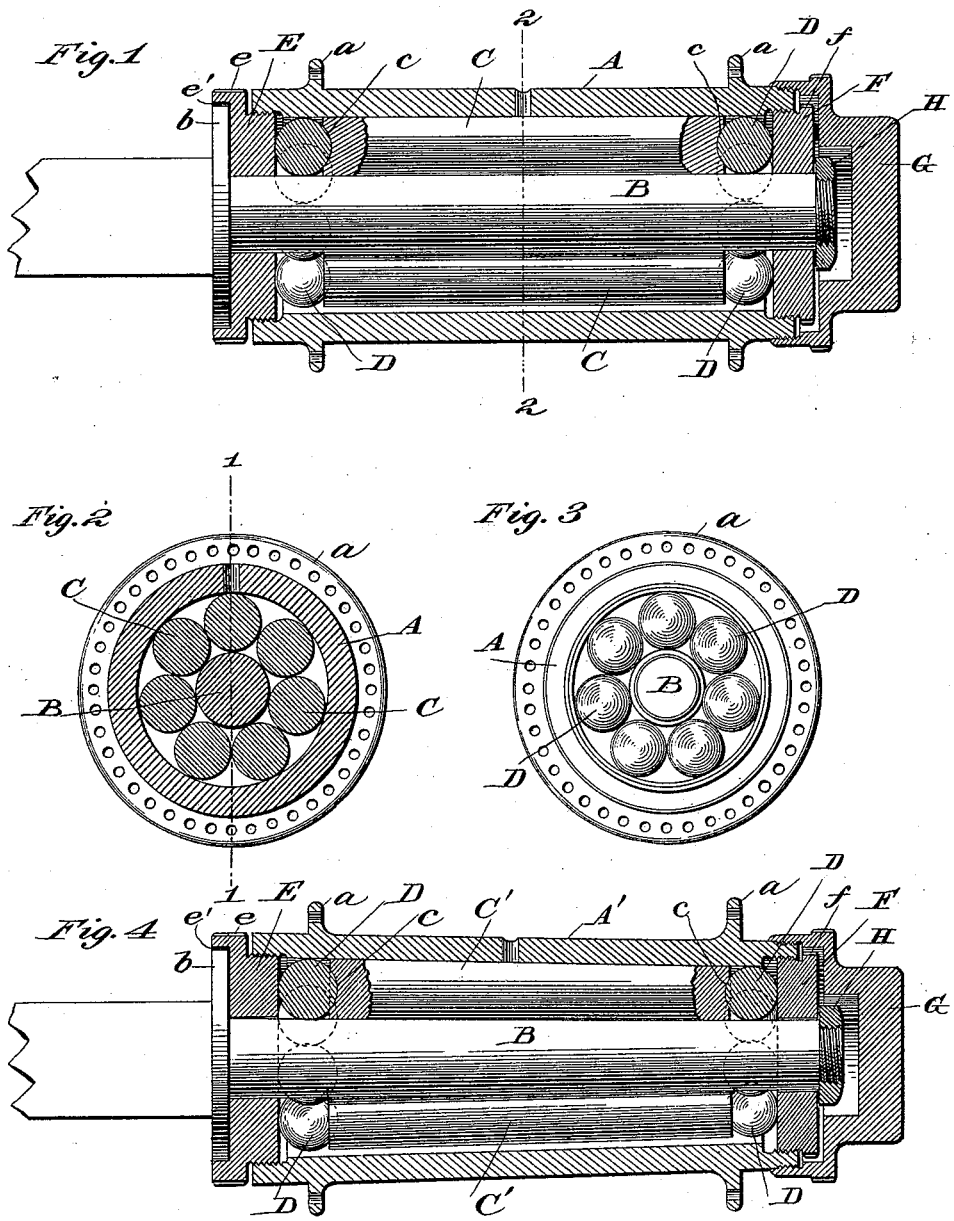
Witnesses:
J. P. Coleman
M. E. Ousand
Inventor
W. L. Dismukes,
By Harmon & Johnson
Att'ys

UNITED STATES PATENT OFFICE.

WILLIAM LOUIS DISMUKES, OF NASHVILLE, TENNESSEE, ASSIGNOR OF ONE-THIRD TO WILLIAM CUMMINS AND SAMUEL McKAY, OF SAME PLACE.

ROLLER-BEARING.

SPECIFICATION forming part of Letters Patent No. 582,521, dated May 11, 1897.

Application filed March 3, 1897. Serial No. 625,853. (No model.)

*To all whom it may concern:*

Be it known that I, WILLIAM LOUIS DISMUKES, a citizen of the United States, residing at Nashville, Davidson county, Tennessee, have invented certain new and useful Improvements in Roller-Bearings, of which the following is a specification.

My invention relates to roller-bearings, and more particularly to such bearings applied to carriages and wagons, and my object is to provide a roller-bearing for such vehicles which shall be simple and durable and capable of being economically manufactured and in which the number of parts is reduced to a minimum while retaining all of the essential advantages to be derived by the use of bearings of the character defined.

With this object in view my invention consists in the novel construction of parts and the details thereof, as hereinafter described, and more particularly pointed out in the claims, with reference to the accompanying drawings, in which—

Figure 1 is a central vertical section on line 1 1, Fig. 2, of my improved bearing, partly in elevation. Fig. 2 is a transverse vertical section on the line 2 2, Fig. 1. Fig. 3 is an end elevation with dust-cap and nuts removed. Fig. 4 is a similar view to Fig. 1 of a slightly-modified form.

Referring to the drawings, in which the same reference-characters relate to the same parts in all the views, A is the hub of the wheel, internally screw-threaded at the ends, which hub is provided with any of the ordinary means for attaching the spokes, perforated flanges $a$ being shown, for example, to which flanges steel spokes may be secured in the customary manner, forming a wheel for a light vehicle.

The axle B is provided with a projecting flange $b$ at the inner end and is screw-threaded at its outer end and passes centrally through the cylindrical bore of the hub A, in which it is supported equally on all sides by means of antifriction-rolls C, on each end of which rolls are formed spherically-shaped recesses $c$, in which are seated antifriction-balls D. The rolls C are closely confined within the hub, the adjacent rolls being in contact with each other, and every roll being in contact with the axle B and with the interior of the hub. The balls D are similarly confined against the ends of the rolls by means of an inner adjusting-nut E, having screw-threaded engagement with the interior of the hub A, and an outer adjusting-nut F, having a similar screw-threaded engagement with said hub. Both of said nuts have their inner faces smooth and flat and are adjusted to contact with the balls D, so as to press said balls equally into their seats $c$ on the ends of the rolls.

The inner nut E has a projecting serrated flange $e$, by which the nut is turned for adjustment, and the said nut is recessed, as shown at $e'$, on its outer face, so that the flange $e$ will project over and embrace the flange $b$ on the axle.

The outer end of the axle, as before indicated, is screw-threaded, to which screw-threaded portion is fitted a locking-nut H, which nut prevents the wheel from slipping off the axle and should be so adjusted as not to have any appreciable frictional contact with the adjusting-nut F as the latter rotates with the hub.

The outer end of the hub is provided with a dust-cap G, which is screw-threaded to fit a corresponding screw-threaded portion on the outer end of the hub and rotates therewith.

By making the recesses in the end of the friction-rolls of a spherical shape to conform to the spherical contour of the balls D, I find that the balls are subjected to an even pressure on their contacting-surfaces, and I thereby not only lessen the wear to the lowest degree, but I am able by the use of the flat-faced adjusting wear-nuts E and F in conjunction therewith to support the friction rolls and balls within the bore of the hub without the use of any additional tie-rods commonly employed in roller cages or bearings of the kind to which my invention relates, and consequently a wheel provided with the roller-bearing hub embodying my invention can be removed from the axle and replaced without disturbing in the least either the balls or the rolls, as the latter are supported within said hub by an even pressure on all sides.

It will be understood, of course, that in assembling the parts with the hub in a vertical position the inner wear-nut E is screwed in place, leaving a small space between the end of the hub and the projecting flange for further adjustment after the wheel has been put on the axle, in case of wear, and the balls D are placed in position upon the flat inner face of said nut, their outer surfaces being in contact with the interior of the hub. The rolls C are then slipped into place, their peripheries being held in close contact with the bore of the hub and in close contact with each other. The outer set of balls D are then placed in position, one ball being seated in each recess on the outer end of each friction-roll, and finally the outer wear-nut F is screwed into place until its flat face contacts with the balls, thereby confining the rolls and balls between the two sets of wear-nuts with a pressure sufficient only to hold them in place. The parts being thus assembled, the wheel can be held in any position without disturbing the balls or rolls and can be readily slipped onto the axle which supports the wheel, through contact with the balls and rolls the axle-flange $b$ limiting the movement of the hub inwardly and the lock-nut H on the outer end of the axle limiting the movement outwardly. The dust-cap may then be screwed into place, as shown in Fig. 1.

When it becomes necessary to adjust the bearing on account of any wear, the inner adjusting-nut E can be quickly and readily screwed farther into the hub by means of the serrated flange $e$ without removing the wheel from the axle, and ordinarily this adjustment will be found to be sufficient, but if it is desired also to adjust the outer nut F it is only necessary to remove the dust-cap to give access to the serrated flange $f$ of said nut.

Instead of making the rolls and hub cylindrical these may be made conical, as shown in Fig. 4, where the hub A' has a conical bore and the rolls C' taper outwardly, in which case the outer balls D will be smaller in diameter than the inner balls, the other parts being the same, as already described.

I claim as my invention—

1. In a roller-bearing, a hub for a wheel, having internally-screw-threaded ends, in combination with an axle passing centrally therethrough, antifriction-rolls arranged around said axle in contact therewith, with each other and with the inner surface of the hub, the said rolls being provided with spherically-shaped recesses in their ends, a series of balls seated in the recesses in the outer ends of the rolls and adjustable flat-faced wear-nuts engaging the screw-threads in said hub and confining the rolls and balls between them, substantially as described.

2. In a roller-bearing, the combination with the hub of a wheel, of an axle passing centrally therethrough, provided with an inner flange for limiting the inward movement of the wheel or hub, and screw-threaded at its outer end, a series of antifriction-rolls arranged around the axle in contact therewith, with each other and with the bore of the hub, said rolls being provided with spherically-shaped recesses in their ends and wear-nuts having flat inner faces adjustably secured to the hub, and confining said balls to the recesses in the ends of the rolls, the inner nut being provided with an outwardly-projecting flange recessed to fit the flange on the axle, balls seated in the recesses in the outer ends of the rolls, and an outer wear-nut adjustably mounted in the bore of the hub provided with a flange and a lock-nut on the screw-threaded end of said axle, substantially as described.

In testimony whereof I have signed my name to this specification in the presence of two subscribing witnesses.

WILLIAM LOUIS DISMUKES.

Witnesses:
J. S. McFADDEN,
W. D. MOORE.